(12) United States Patent
Lu et al.

(10) Patent No.: US 11,500,340 B2
(45) Date of Patent: Nov. 15, 2022

(54) PERFORMANCE EVALUATION BASED ON RESOURCE DYNAMICS

(71) Applicant: International Business Machines Corporation, Armonk, NY (US)

(72) Inventors: Yingdong Lu, Yorktown Heights, NY (US); Mayank Sharma, Spring, TX (US); Mark S. Squillante, Greenwich, CT (US); Bo Zhang, Hoboken, NJ (US); Kazutoshi Yamazaki, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 16/197,684

(22) Filed: Nov. 21, 2018

(65) Prior Publication Data

US 2020/0159174 A1    May 21, 2020

(51) Int. Cl.
*G05B 13/04*    (2006.01)
*G05B 13/02*    (2006.01)
*G06F 9/50*    (2006.01)

(52) U.S. Cl.
CPC ....... *G05B 13/041* (2013.01); *G05B 13/0265* (2013.01); *G06F 9/5055* (2013.01)

(58) Field of Classification Search
CPC .. G05B 13/041; G05B 13/0265; G06F 9/5055
USPC .......................................................... 703/2
See application file for complete search history.

(56) References Cited

U.S. PATENT DOCUMENTS

| 8,195,475 B1* | 6/2012 | Landsman | G16H 50/20 705/2 |
| 2006/0178960 A1* | 8/2006 | Lepman | G06Q 40/025 705/30 |
| 2007/0219837 A1* | 9/2007 | Lu | G06Q 10/06 705/7.28 |
| 2008/0183545 A1* | 7/2008 | Deitrich | G06Q 10/10 705/7.14 |

(Continued)

OTHER PUBLICATIONS

N. Gast et al. / Performance Evaluation 126 (2018) 1-21. ("A refined mean field approximation of synchronous discrete-time population models") Available online Jul. 19, 2018. (Year: 2018).*

(Continued)

*Primary Examiner* — Iftekhar A Khan
(74) *Attorney, Agent, or Firm* — Scully, Scott, Murphy & Presser, P.C.; Daniel P. Morris (57) ABSTRACT

Methods and systems of evaluating a performance of an entity are described. A processor may obtain first data indicating tier attributes of resources of the entity, second data indicating function attributes of the resources, and third data indicating productivity attributes of the resources. The processor may train a model based on the first data, the second data, and the third data, the model may represent transitions of the resources over time. The processor may receive a set of controls including at least an objective to optimize a performance of the entity. The processor may generate a controlled model by integrating the set of controls into the model. The processor may determine a set of outcomes from the controlled model that includes at least a (Continued)

set of transitions relating to the resources that may optimize the performance of the entity.

19 Claims, 5 Drawing Sheets

(56) References Cited

U.S. PATENT DOCUMENTS

| | | | | |
|---|---|---|---|---|
| 2008/0195560 | A1* | 8/2008 | Sutherland | G06F 21/10 705/400 |
| 2009/0271240 | A1* | 10/2009 | Kumar | G06Q 10/0631 705/7.12 |
| 2009/0299806 | A1* | 12/2009 | Lu | G06Q 10/06 235/376 |
| 2013/0080641 | A1* | 3/2013 | Lui | H04L 41/0886 709/226 |
| 2016/0196587 | A1* | 7/2016 | Eder | G06Q 30/0271 705/14.49 |
| 2016/0321935 | A1* | 11/2016 | Mohler | G09B 5/08 |
| 2017/0147955 | A1* | 5/2017 | Ezry | G06F 16/29 |
| 2018/0300364 | A1* | 10/2018 | Xu | G06F 16/951 |
| 2019/0102462 | A1* | 4/2019 | Botea | H04L 67/306 |
| 2019/0324444 | A1* | 10/2019 | Celia | G06N 3/088 |
| 2019/0339688 | A1* | 11/2019 | Celia | G05B 23/0229 |

OTHER PUBLICATIONS

Davis et al. ("Stochastic Optimization Models for Workforce Planning, Operations, and Risk Management" http://pubsonline.Informs.org/journaJ/serv/ vol. 10, No. 1, Mar. 2018, pp. 40-57 (Year: 2018).*

Davis, M.J., et al., "Stochastic Optimization Models for Workforce Planning, Operations, and Risk Management", Service Science, Mar. 2018, pp. 40-57, vol. 10, No. 1.

Lu, Y., et al., "Workforce management: Risk-based financial planning and capacity provisioning," IBM Journal of Research and Development, Jul./Aug. 2014, pp. 8:1-8:10, vol. 58, No. 4, Paper 8.

Santos, C., et al., "Workforce Planning and Scheduling for the HP IT Services Business," Multidisciplinary International Conference on Scheduling: Theory and Applications (MISTA 2009), Aug. 10-12, 2009, pp. 720-723.

Hall, A.O., et al., "Simulating and Optimizing: Military Manpower Modeling and Mountain Range Options," Dissertation submitted to the Faculty of the Graduate School of the University of Maryland, College Park in partial fulfillment of the requirements for the degree of Doctor of Philosophy, Spring 2009, 169 pages.

Ramamurthy, K.N., et al., "Identifying Employees for Re-skilling Using an Analytics-Based Approach", 2015 IEEE International Conference on Data Mining Workshop (ICDMW), Nov. 14-17, 2015, pp. 345-354.

* cited by examiner

PERFORMANCE EVALUATION BASED ON RESOURCE DYNAMICS

BACKGROUND

The present application relates generally to computers, and computer applications, and more particularly to computer-implemented methods and systems relating to resource management systems.

An entity (e.g., an organization, a company) may include a plurality of resources such as computer resources, equipments, a workforce, and/or other types of resources. In some examples, the entity may experience movements of resources, such as when resources are added, or moving between different tiers (e.g., tier promotions, switch of positions). In some examples, the tiers of resources are defined by multi-dimensional and oftentimes high-dimensional attributes, such as, a software engineer of a particular tier may be an expert in a first function (e.g., a programming language) and may be proficient in a second function. The movements of the resources between different tiers, and also the progression and regression of attributes such as a competency possessed by a resource in a function or skill, are transitions that constitute resource dynamics within the entity. These resource dynamics may sometimes include unpredictable behavioral characteristics and may include uncertainties that will affect an overall performance of the entity.

SUMMARY

In some examples, a method of evaluating a performance of an entity is generally described. The method may include obtaining, by a processor, first data indicating tier attributes of a plurality of resources of an entity. The method may further include obtaining, by the processor, second data indicating function attributes of the plurality of resources. The method may further include obtaining, by the processor, third data indicating productivity attributes of the plurality of resources. The method may further include training, by the processor, a model based on the first data, the second data, and the third data. The model may represent one or more transitions of the plurality of resources over time. The transitions of the plurality of resources may be based on the tier attribute, the function attribute, and the productivity attribute of the plurality of resources. The method may further include receiving, by the processor, a set of controls comprising at least an objective to optimize a performance of the entity. The method may further include generating, by the processor, a controlled model by integrating the set of controls into the model. The method may further include determining, by the processor, a set of outcomes from the controlled model. The set of outcomes may include at least a set of transitions relating to the plurality of resources, and the set of transitions may optimize the performance of the entity.

In some examples, a system of evaluating a performance of an entity is generally described. The system may include a memory device and a hardware processor configured to be in communication with each other. The memory device may be configured to store a database. The database may include first data indicating tier attributes of a plurality of resources of an entity, second data indicating function attributes of the plurality of resources, and third data indicating productivity attributes of the plurality of resources. The hardware processor may be configured to obtain the first data, the second data, and the third data from the memory device. The hardware processor may be further configured to train a model based on the first data, the second data, and the third data. The model may represent one or more transitions of the plurality of resources over time. The transitions of the plurality of resources may be based on the tier attribute, the function attribute, and the productivity attribute of the plurality of resources. The hardware processor may be further configured to receive a set of controls comprising at least an objective to optimize a performance of the entity. The hardware processor may be further configured to generate a controlled model by integrating the set of controls into the model. The hardware processor may be further configured to determine a set of outcomes from the controlled model. The set of outcomes may include at least a set of transitions relating to the plurality of resources, and the set of transitions may optimize the performance of the entity.

In some examples, a computer program product of evaluating a performance of an entity is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In some examples, the entity may operate under different compositions, or combinations, of resources at different situations. For example, a first composition of resources may be assigned to a first task, while a second composition of resources may be assigned to a second task. Different compositions assigned to the same task may result in different outcomes of the task, and may affect the performance of the entity differently. In some examples, the outcomes from each composition of resources may be evaluated, such as by using a performance evaluation system configured to evaluate an effect of the outcomes on the performance of the entity (e.g., completeness, efficiency, profit). For example, the performance evaluation system may evaluate an outcome (e.g., profits) from a sales team in the past three months and analyze how the outcomes affect the performance of the entity. However, such analysis may be performed with coarse data granularity, and the evaluations may be based on discrete-time analysis, which neglects the dynamics of the uncertainties within the intervals between each time instance. For example, the movement of the sales team, such as personnel change dynamics in the sales team, or whether particular personnel attended training programs within the three months to improve particular skills, are not part of the evaluation. In order to account for these neglected uncertainties, there is a need for an improved performance evaluation system to evaluate performances of resources and entity while considering the resource dynamics of the entity, and also addressing complex, behavior-related characteristics and uncertainties associated with the resource dynamics. Specifically, there is a need to improve the performance evaluation system to take into account the utilities ramp-up time after each resource dynamics event (e.g., changes to the resources of the entity), or the eligibility of individual resources before each resource dynamics event. There is also a need to improve the performance evaluation system by modeling and optimizing the resource dynamics in the entity to improve both individual utility (bottom up) and attainment of target outcomes (top down).

Figure 1:
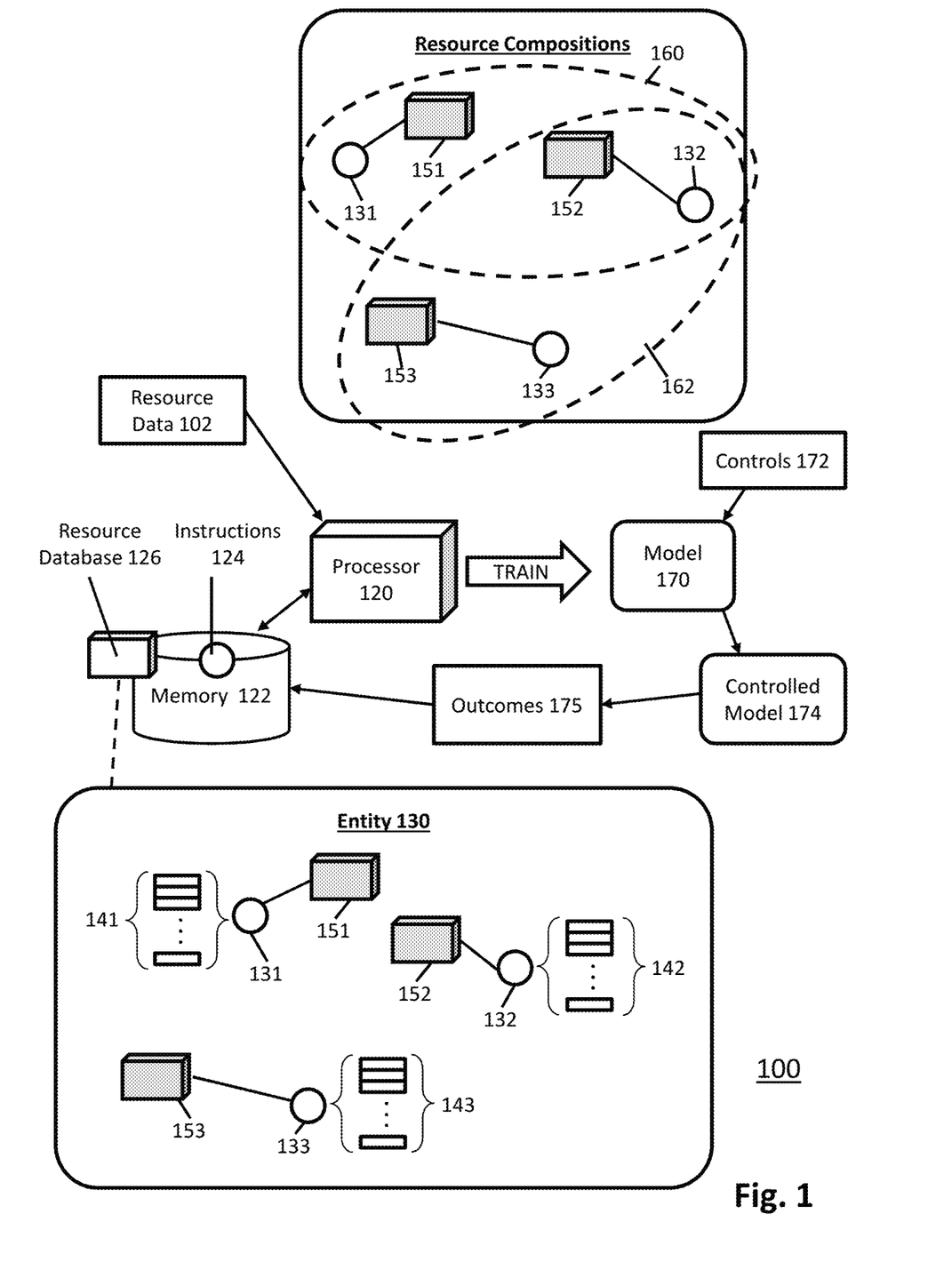
FIG. 1 illustrates an example computer system, in one embodiment, that can be utilized to implement performance evaluation based on resource dynamics.

To be described in more detail below, a system 100 in accordance with the present disclosure is an improved performance evaluation system that models resource dynamics including post-action utilities ramp-up time and evolution, as well as pre-action eligibility measures using, for example, measure-valued processes. The system 100 further controls the resulting measure-valued processes from both top-down and bottom-up and performs optimizations to reduce ramp-up time or to improve eligibility measures. The system 100 also models uncertainties and the resource dynamics using multi-time-scale stochastic processes, for example, discrete-time Markov chains with Brownian bridge embedded between discrete time epochs and provides optimal control of the resulting stochastic processes. Thus, the system 100 is configured to manage the resource dynamics of the entity by addressing complex, human-behavior-related characteristics and uncertainties that may have been neglected in traditional performance evaluation systems.

FIG. 1 illustrates an example computer system, in one embodiment, that can be utilized to implement performance evaluation based on resource dynamics, arranged in accordance with at least some embodiments described herein. In some examples, the system 100 may be implemented with a processor 120 and a memory 122 configured to be in communication with each other. In some examples, the processor 120 may be a central processing unit of a computer device, and may be configured to control operations of the memory 122 and/or other components of the computer device. In some examples, the system 100 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure. In some examples, the processor 120 and the memory 122 may be components of a cloud computing platform that may be employed (such as by an entity 130) to implement the methods described in accordance with the present disclosure.

The memory 122 is configured to selectively store instructions executable by the processor 120. For example, in one embodiment, the memory 122 may store a set of evaluation instructions 124 ("instructions 124"), where the evaluation instructions 124 include instructions, such as executable code, related to machine learning algorithms and/or other algorithms or techniques, which may implement the system 100. The processor 120 is configured to execute one or more portions of the instructions 124 in order to facilitate implementation of the system 100. For example, to be described in more detail below, the processor 120 is configured to execute the instructions 124 to train a model 170, impose or integrate controls on the model 170 to generate a controlled model 174, determine a set of outcomes 175 by determining a solution to the controlled model 174, autonomously retrain the model 170 with the outcomes 175, and output recommendations to compose or allocate one or more resource of an entity 130 based on the outcomes 175. In some examples, the instructions 124 may be packaged as a standalone application that may be installed on the computer device implementing the system 100, such that the instructions 124 may be executed by the processor 120 to implement the system 100. In some examples, the instructions 124 may be stored in a programmable hardware component that may be embedded as part of the processor 120.

In an example, the entity 130 may be a company, an organization, and/or other types of entities. The entity 130 may include one or more types of resources such as computer devices, equipments, a workforce, and/or other resources. In the example shown in FIG. 1, the entity 130 may include a workforce labeled as resources 131, 132, 133, and may include a set of computer devices including resources 151, 152, 153. The memory 122 may be further configured to store a resource database 126 that includes data identifying the resources of the entity 130. For example, the resource database 126 may include identifiers of each resource 131, 132, 133, 151, 152, 153. In some examples, a resource of the entity 130 may be assigned, associated, or linked to one or more other resources of the entity 130. For example, the resource 151 may be assigned to be used by the resource 131, the resource 152 may be assigned to be used by the resource 132, the resource 153 may be assigned to be used by the resource 133. In another example, the resources 131 and 132 may belong to a composition 160, and the resources 132 and 133 may belong to a composition 162. The resource database 126 may further include data indicating the assignments, links, and associations between the resources of the entity 130.

Further, each resource may correspond to a set of attributes. For example, the resource 131 may correspond to attributes 141, the resource 132 may correspond to attributes 142, the resource 133 may correspond to attributes 143. Some examples of the attributes 141, 142, 143 may include a tier, one or more skills or function, productivity, and/or other attributes. A tier attribute may be a level, tier, or position among a plurality of tiers defined by the entity 130. For example, the entity 130 may define a plurality of tiers for a particular job title (e.g., computer specialist I, computer specialist II, etc.), may define particular levels for different job titles and/or experience (e.g., level-1 for 0-2 years experience, level-2 for 2-4 years experience, etc.), or tiers expressed through texts (e.g., junior computer specialist, senior computer specialist, etc.). In some examples, a tier of a resource of the entity 130 may reflect other attributes of the resource, such as experience, capabilities, compensation level, role sophistication, reporting structure, and/or other attributes. Each resource may transition from one tier to another tier, such as when a particular resource transition to a higher tier as a result of a promotion or an accumulation of more experience. The tier attribute may change as resources transition from one tier to another tier. The processor 120 may update the resource database 126 to reflect the transitions and to update the attributes associated with the transitions. The transitions of tiers of each resource may constitute the resource dynamics of the entity 130.

The skills or function attribute may correspond to one or more skills or functions possessed by a resource. For example, a programming language may be a skill possessed by a resource among the workforce. Each skill or function may be associated with a level, such as novice, proficient, expert, or other indicators of skill levels. Each resource may correspond to one or more skills at different skill levels, and a combination of the skills along with corresponding levels in the combination may reflect other attributes such as an area of expertise, knowledge, talents, abilities, competencies, experience and other attributes of the corresponding resource. The skills or function attribute may change, such as increase in competency of a particular skill based on training or additional experience, or regression over time due to a lack of use or deviation from latest advances in a field relating to the skill. The processor 120 may update the resource database 126 to reflect the changes to the skills of functions of the resources. The changes in skill or function level are considered as transitions of the function attribute, and may constitute the resource dynamics of the entity 130.

The productivity attribute may characterize a degree to which resources can produce from an operations perspective with respect to the collection of skills and tiers of the resources, and relative to other resource with the same skills and tiers. Productivity may be measured through various performance metrics associated with each collection of skills and tier, such as a completeness of a task performed by the resources, an efficiency of the resources, and/or other performance metrics. The processor 120 may update the resource database 126 to reflect results of tasks performed by the resources in order to determine productivity of the resources. The updates and changes to productivity attribute of the resources may constitute the resource dynamics of the entity 130.

The processor 120 may receive resource data 102 from various data sources. For example, the resource data 102 may be received from the resource database 126. In some examples, the resource data 102 may be received from other databases of the entity 130 that may be stored in the memory 122, or in memory devices outside of the entity 130 (e.g., cloud storage). The resource data 102 may include data relating to the resources of the entity 130, including respective tiers, functions, and productivity attributes of each resource among the resource data 102.

Based on the data reflecting tiers, functions, and productivity of resources being stored in the resource database 126, the processor 120 may quantify the tier, functions, and productivity attributes in order to train the model 170 with the quantified attributes. In some examples, the processor 120 may quantify the tier, functions, and productivity attributes by assigning values, parameters, variables, functions, and/or other representations to represent each attribute in a format that may be processed by the processor 120 to train the model 170. The model 170 may model various evolutions and transitions within the resource dynamics of the entity 130 over time. By quantifying the attributes, the system 100 may train the model 170 to determine outcomes that will optimize a performance of the entity 130. Thus, the system 100 is an improved performance evaluation system of the entity 130 by using the quantified tier, function, and productivity attributes to train the model 170 that models the evolution and dynamics of resource transitions within the entity 130. Further, the system 100 may provide statistical analysis of data related to the workforce and various decisions or assessments of the entity 130, with a goal of determining, understanding and/or quantifying correlations, causations, relevant effects, and irrelevant effects.

The model 170 may be a time inhomogeneous Markov chain model (further described below). In some examples, the model 170 may characterize the evolution of the resources, such as using the transitions between states of the Markov chain to represent various resource dynamics events over time, and using the states of the Markov chain to represent the attributes of resources. Some examples of resource dynamics events may include addition or new resources (e.g., new hires), acquisition of new functions (e.g., via training), degradation of old functions (e.g., due to lack of use), promotion or changes to new tiers (e.g., switch positions or team), and/or other events. Upon training the model 170, the processor 120 may receive a set of controls 172, which may include one or more constraints and objectives relating to the entity 130. The processor 120 may integrate the controls on the model 170, such as by formulating a stochastic control problem with the constraints and the objectives, to generate a controlled model 174 that includes the model 170 and the controls 172, where the controlled model 174 is a Markov chain. The processor 120 may determine a set of solutions to the controlled model 174, where the set of solutions are outcomes 175. The outcomes 175 may include data that indicates optimization of a performance of the entity 130, such as maximizing a profit, optimizing an efficiency, minimizing costs, and/or other performance metrics of the entity 130. For example, the outcomes 175 may indicate a set of compositions 160, 162, where each composition includes a respective set of resources, and the distribution of resources in the compositions 160, 162 may minimize a cost incurred on the entity 130. In some examples, the processor 120 may evaluate the performance of the entity 130 by determining functionals of the controlled model 174. In some examples, the set of outcomes 175 may further include one or more recommendations and/or instructions, which may modify the one or more resources among the entity 130. For example, the set of outcomes 175 may provide recommendations to add new resources to the compositions, or to redistribute resources among the compositions, or to reassign tasks to different resources of particular attributes and associated levels, that may result in optimizing the performance of the entity 130.

In an example, the system 100 may develop the model 170 using microscopic models that represent the bottom-up perspective of the resources and/or using macroscopic models that represent the top-down perspective of the organization. To be described in more detail below, the model 170 and various forms of resource data among the resource database 126 (including data to forecast the demand for different resources) may be used to facilitate an analysis and optimization of resource dynamics as part of a data-driven decision making under uncertainty framework. An example below describes the development of the model 170 using macroscopic models. The model 170 may model resource dynamics such as the effects of an evolving composition of resources over time on the entity 130. The model 170 may provide an estimate of a trajectory of the resource compositions under current or alternative rules and policies defined by the entity 130.

In the descriptions below, a bold-type notation may represent vectors and matrices, with their elements identified through subscripts, blackboard bold may represent sets of elements, the straight brackets | | may represent a number of elements in a set or an operator (e.g., |A| denotes the number of elements in the set A), and a transpose of a vector or a matrix is denoted by.

To develop the model 170 that models evolution and resource dynamics of the entity 130, the system 100 may train the model 170 that is based on a time inhomogeneous Markov chain denoted as $Z(t):=(Z_\omega(t))_{\omega \in \mathbb{B}}$ over the state space $\mathbb{N}:=\{n\in\mathbb{Z}_+^{|\mathbb{B}|}: n\leq N\}$, where $\mathbb{B}:=\mathbb{F}\times\mathbb{L}\times\mathbb{Q}$ represents the set of all possible combinations of the tier, function, and productivity attributes. The notation $\mathbb{F}$ is related to the function attribute, and denotes a family of subsets of a set of functions, denoted as $\mathbb{S}$, that may possibly be possessed by the resources of the entity 130 (e.g., F is a subset of functions among a set of functions S). The notation $\mathbb{Q}$ is related to the productivity attribute, and denotes a set of productivity levels of the resources of the entity 130, where a discrete value q ($q\in\mathbb{Q}$) represents the fraction of work that the resource can accrue as compared to an empirically estimated maximum amount that a resource may execute in a given time period. The notation $\mathbb{L}$ is related to the tier attribute, and denotes a set of possible tiers, such as $\mathbb{L}=\{1, 2, \ldots, L\}$, of a resource within the entity 130 at any given time, where a tier at a given time is represented by a positive integer $\ell$ as an element of $\mathbb{L}$, for integer L>0. The notations n=$(n_\omega)_{\omega\in\mathbb{B}}$ and $N=(N_\omega)_{\omega\in\mathbb{B}}$, where $N_\omega<\infty$, define an upper bound on the number of resources that may possess the combination of attributes $\omega\in\mathbb{B}$. The random variable $Z_\omega(t)$ with $\omega=(f, \ell, q)$ represents the number of resource in a period t in which a resource may possess the family of skills $f\in\mathbb{F}$, tier $\ell\in\mathbb{L}$ and productivity level $q\in\mathbb{Q}$. In an example, the entity 130 may define a hierarchical structure of tiers, such that the tier for a resource may be a first-order indication of various attributes, such as competency, capabilities, experience, compensation level, cost, and/or other attributes possessed by the resource as well as the responsibilities assigned to the resource.

The processor 120 may perform an analysis on the time inhomogeneous Markov chain over a horizon, or time range, of T+1 periods to analyze an evolution and resource dynamics of the entity 130 over time. In an example, the analysis may begin at t=0 such that Z(0) provides an initial number of resources for all probable combinations of families of skills $f\in\mathbb{F}$, tiers $\ell\in\mathbb{L}$ and productivity levels $q\in\mathbb{Q}$. Thus, the dynamics of the time inhomogeneous Markov chain may constitute the resource dynamics of the entity 130, such that the model 170 may be denoted as Z(t+1) and may be expressed as:

$$Z(t+1)=Z(t)+H(t)-A(t)+G'(t)\mathbf{1}-G(t)\mathbf{1}, t\in\{0,\ldots,T\}$$

where H(t) denotes a $|\mathbb{B}|$-dimensional random vector of the number of new resources added to the workforce of the entity 130 for a time period t (e.g., new hiring), A(t) denotes a $|\mathbb{B}|$-dimensional random vector of the number of current resources departing from the workforce of the entity 130 for a period t, G(t) denotes a $|\mathbb{B}|\times|\mathbb{B}|$ random matrix of a number of internal transitions by current resources (e.g., switch of positions or tiers within the entity 130) for a period t, and 1 denotes a $|\mathbb{B}|$-dimensional column vector of all ones. The random matrices G(t) may incorporate all internal transitions from one time period to the next, including changes to functions, tier, and productivity. Further, the notation G'(t)1 represents a random vector of the number of transitions into every $\omega\in\mathbb{B}$, whereas the notation G(t)1 represents a random vector of the number of transitions out of every $\omega\in\mathbb{B}$. Also, G(t) may be time inhomogeneous random matrices, and H(t) and A(t) may be time inhomogeneous random vectors supporting different forms of time-varying behaviors for the evolutionary resource dynamics within the entity 130, including various types of seasonal effects exhibited in practices by the entity 130.

In an example, a performance metric of the entity 130, such as an expected net-benefit, based on the resource dynamics may be obtained as a difference between a set of rewards accrued and an amount of costs incurred by the entity 130 for resources with similar attributes. For example, let $\check{r}_{(f,\ell)}(t)$ denote a reward rate of a maximally productive (or full capacity) resource possessing attributes (f, $\ell$), let $\check{c}_{(f,\ell)}(t)$ denote the cost rate of the resource possessing the attributes (f, $\ell$), let $\check{h}_{(f,\ell)}(t)$ denote the cost rate for adding a new resource possessing the attributes (f, $\ell$), and let $\check{g}_{(f,\ell),(\tilde{f},\tilde{\ell})}(t)$ denote a cost rate for training and related decisions applied to a resource possessing the attributes (f, $\ell$) to influence a transition from (f, $\ell$) to ($\tilde{f}$, $\tilde{\ell}$) (e.g., transition from a novice to an expert level of a function), for period t. Then, for one or more resources of the entity 130 that possesses the attributes (f, $\ell$) over period t, the expected rewards $R_{(f,\ell)}(t)$ and costs, including running costs $C_{(f,\ell)}(t)$, training costs $G_{(f,\ell),(\tilde{f},\tilde{\ell})}(t)$ and additions (e.g., additions of resources) costs $H_{(f,\ell)}(t)$, may become controls (e.g., controls 172) to the model 170, and may be expressed as:

$$\mathcal{R}_{(f,\ell)}(t) = \check{r}_{(f,\ell)}(t)\times\mathbb{E}[(\textstyle\sum_{q\in\mathbb{Q}} Z_{(f,\ell,q)}(t)\times q)\wedge D_{(f,\ell)}(t)]$$
$$\mathcal{C}_{(f,\ell)}(t) = \check{c}_{(f,\ell)}(t)\times\mathbb{E}[\textstyle\sum_{q\in\mathbb{Q}} Z_{(f,\ell,q)}(t)]$$
$$\mathcal{G}_{(f,\ell),(\tilde{f},\tilde{\ell})}(t) = \check{g}_{(f,\ell),(\tilde{f},\tilde{\ell})}(t)\times\mathbb{E}[\textstyle\sum_{q\in\mathbb{Q}} G_{(f,\ell,q),(\tilde{f},\tilde{\ell},q)}(t)]$$
$$\mathcal{H}_{(f,\ell)}(t) = \check{h}_{(f,\ell)}(t)\times\mathbb{E}[\textstyle\sum_{q\in\mathbb{Q}} H_{(f,\ell,q)}(t)]$$

where $D_{(f,\ell)}(t)$ denotes a random variable of a demand for resources with the attributes (f, $\ell$) over period t and $x\wedge y:=\min\{x, y\}$. Note that the rewards for any (f, $\ell$) may only be accrued up to the minimum of the total capacity and the total demand for such individuals over the period and that the various costs for any (f, $\ell$) do not depend on the productivity level of individuals. The total capacity for any (f, $\ell$) may be referred to as full-time equivalents (FTEs), and may represent a cumulative ability to satisfy demand for resources with attributes (f, $\ell$) normalized by the maximally productive resources with these attributes (e.g., the number of resources possessing attributes (f, $\ell$, q) times the productivity for individuals at level q summed over all q). As will be described in more detail below, the processor 120 may append particular conditions (constraints and objectives) relating to the controls 172 on the model 170 to generate the controlled model 174.

In some examples, the entity 130 may be a large-scale system, such as including a relatively large number of resources, and the resource database 126 may include a relatively large amount of data. In some examples, the instructions 124 may indicate a threshold, such that the processor 120 may monitor a size (e.g., amount of data) of the resource database 126 based on the threshold. For example, in response to the size of the resource database 126 being greater than the threshold, the processor 120 may determine a need to apply an approximation technique to train or develop the model 170. The processor 120 may execute the approximation technique to determine solutions for the time inhomogeneous Markov chain model 170 and the corresponding stochastic controls. In some examples, the approximation technique being applied by the processor 120 may be a mean-field analysis through a fluid limit of the controlled Markov chain model 174, thus reducing the formulated problem to a linear optimization problem that can be solved by the processor 120. Further, accuracy for large-scale system may be assured by the related functional strong law of large number for large-scale systems. The processor 120 may also quantify uncertainties at a tractable granularity by augmenting the mean-field approximation with a Gaussian random variable that captures the variability and risks associated with each action of the discrete-time dynamical system as part of our mean field analysis. Then, the processor 120 may determine a set of solutions for the problem formulated from the approximated model for large-scale systems. The approximation technique may be a mean-field limit approximation that significantly reduces the dimensionality of the state space $\mathbb{N}$ while retaining key aspects of the resource dynamics. The application of mean-field approximation may allow the processor 120 to determine a deterministic, discrete-time dynamical system, or a mean-field (or fluid limit) model. Hence, the mean-field approximations may provide relative accurate results for entities that may be large-scale systems.

The application of the approximation technique may include using a standard fluid limit of the time inhomogeneous Markov chain Z(t), and from the functional strong law of large numbers, a deterministic dynamical system $z(t)=(z_\omega(t))_{\omega \in \mathbb{B}}$ with initial condition z(0) and system dynamics denoted as:

$$z(t+1)=z(t)+h(t)-a(t)+g'(t)1-g(t)1, t \in \{0, \ldots, T\}$$

where $h(t):=(h_\omega(t))_{\omega \in \mathbb{B}}$, $a(t):=(a_\omega(t))_{\omega \in \mathbb{B}}$, and $g(t):=(g_{\omega,\tilde{\omega}}(t))_{\omega,\tilde{\omega} \in \mathbb{B}}$ with $h_\omega(t)$ representing the expected number of new resources possessing attributes w that are added to the entity 130 in period t, $a_\omega(t)$ represents the expected number of current resources possessing attributes w who departed from the entity 130 in the period t, $g_{\omega,\tilde{\omega}}(t)$ represents the expected number of current resources possessing attributes w that transitioned to possess the attributes $\tilde{\omega}$ in period t, and $z_\omega(t)$ represents the expected number of resources of the entity 130 that possess attributes $\omega$ for time t. Thus, the approximated model z(t+1) may model the resource dynamics of the entity 130 over the state space $\widehat{\mathbb{N}} := \{\hat{n} \in \mathbb{R}_+^{|\mathbb{B}|} : \hat{n} \leq N\}$. In some examples, $z_\omega(t)$ may be an approximation of $\mathbb{E}[Z_\omega(t)]$, and $z_\omega(t)$ may take on fractional values, unlike the random variable $Z_\omega(t)$, corresponding to the population possessing the attributes $\omega \in B$ for time t.

Based on the approximated model (approximation of the model 170), the processor 120 may also approximate the expected net-benefit of the resource dynamics, such as a difference between the rewards accrued and the costs incurred by the entity 130. For example, under the mean-field approximation model, for resources the organization possessing attributes (f, $\ell$) over the period t, the approximated expected rewards $\hat{R}_{(f,\ell)}(t)$, running costs $\hat{C}_{(f,\ell)}(t)$, hiring costs $\hat{H}_{(f,\ell)}(t)$ and training costs $\hat{G}_{(f,\ell),(\bar{f},\bar{\ell})}(t)$ may be used to control the approximated model, and may be denoted as:

$$\hat{R}_{(f,\ell)}(t) = \check{r}_{(f,\ell)}(t) \times \mathbb{E}[\sum_q Z_{(f,\ell,q)}(t) \times q] \wedge \mathbb{E}[D_{(f,\ell)}(t)]$$

$$\hat{C}_{(f,\ell)}(t) = \check{c}_{(f,\ell)}(t) \times \mathbb{E}[\sum_q Z_{(f,\ell,q)}(t)]$$

$$\hat{H}_{(f,\ell)}(t) = \check{h}_{(f,\ell)}(t) \times \mathbb{E}[\sum_q H_{(f,\ell,q)}(t)]$$

$$\hat{G}_{(f,\ell),(\bar{f},\bar{\ell})}(t) = \check{g}_{(f,\ell),(\bar{f},\bar{\ell})}(t) \times \mathbb{E}[\sum_q G_{(f,\ell,q),(\bar{f},\bar{\ell},\bar{q})}(t)]$$

The processor 120 may perform various evaluations of a performance of the entity 130 by formulating various optimal control problems associated with the model 170 of resource dynamics. The formulation of the optimal control problems may provide indications of how the compositions of resources evolve over time under particular decisions taken as part of a new control policy. For example, the processor 120 may solve the optimal control problems (e.g., determine a set of solutions to the model 170 under particular objectives and constraints) to identify an optimal set of policies and assessment to be taken over time to influence future resource dynamics in desired directions along with estimates of the trajectory of the resource composition under the corresponding control policy.

In an example, the controls 172 may indicate an objective to identify a set of resources that may maximize an expected net-benefit of the entity 130 over a given planning horizon (e.g., a set of future times), including various costs for resource decisions such as hiring, promoting, training and incentivizing retention. The processor 120 may formulate an optical control problem by using the received controls 172 indicating objectives and constraints to integrate controls on one or more characteristics of the model 170, resulting in the controlled model 174. The processor 120 may determine the outcomes 175 by solving the controlled model 174. In some examples, the objectives and constraints indicated by the controls 172 may represent various resource decisions and assessments available to the entity 130 at any time period, such as composing a group of resources that will maximize a performance metric of the entity 130.

A state space of the controlled model 174 may be the same as the time-inhomogeneous Markov chain model 170 described above, which is $\mathbb{N} := \{n \in z_+^{|\mathbb{B}|} : n \leq N\}$, where $\mathbb{B} := \mathbb{F} \times \mathbb{L} \times \mathbb{Q}$ represents the set of all possible combinations of the tier, function, and productivity attributes (f, $\ell$, q). Let H(t) be a $|\mathbb{B}|$-dimensional vector that represents the number of new resources added to the workforce of the entity 130 for every w at time t, and V(t) denotes a $|\mathbb{B}| \times |\mathbb{B}|$ matrix that represents a number of transitions from a current set of resources for every w to the population for every other $\tilde{\omega}$ through any combination of skill or function acquisition, tier promotion, or productivity adjustment at time t, where $\omega:=(f, \ell, q)$ and $\tilde{\omega}:=(\tilde{f}, \tilde{\ell}, \tilde{q})$. Further, let M(t) be a $|\mathbb{B}|$-dimensional vector that represents an amount of incentives that may be provided to the resources improve retention. Let $X(t):=(X_\omega(t))_{\omega \in \mathbb{B}}$ represent a stochastic process governed by the controlled Markov chain or model 170 (e.g., the vector of the current set of resources for each combination of attributes (f, $\ell$, q)$\in \mathbb{B}$ at time t). Thus, the resource dynamics corresponding to the model 170 with the addition of controls H(t), V(t) and M(t) may become the controlled model 174, which may be denoted as X(t+1) and expressed as:

$$X(t+1)=X(t)+H(t)+(V^T(t)-V(t))1+(W^{(t)}-W(t))1-A_M(t)$$

where 1 denotes a $|\mathbb{B}|$-dimensional vector whose components are all 1, $A_M(t)$ denotes a random $|\mathbb{B}|$-vector representing an amount of lost resources at time t given that $M_\omega(t)$ amount of incentives are provided to each $\omega \in \mathbb{B}$, and W(t) represents a random matrix representing the transitions between different sets of resources which may be irrelevant to the entity 130. Note that the probability laws governing $A_M(t)$ and W(t) depend on the state X(t) and controls H(t), V(t) and M(t). In some examples, the processor 120 may determine functional of the Markov chain with the addition of costs for any resource decisions indicated by the controlled model 174, where the functionals may represent a net-benefit of the entity 130. In some examples, the objectives may be defined with respect to different resource decisions and assessments, which may lead to the net-benefit functionals and corresponding optimal control problem formulation being based on particular sets of resources among the entity 130.

In some examples, the processor 120 may formulate the control problems based on resource decisions pertaining to a specific area (e.g., finance, risk management, and/or other area) of the entity 130. For example, a particular formulation of the controlled model 174 may be based on current resources with specific combinations of skills $f \in \mathbb{F}$, without allowing transitions between combinations of skills from $f \in \mathbb{F}$ to $\tilde{f} \in \mathbb{F}$ (e.g., keeping the function attribute fixed). As a result, the combination of functions possessed by resources may be limited, and the resource decisions of adding resources at each level $(\ell, q) \in \mathbb{L} \times \mathbb{Q}$, training, and related decisions to influence transitions between levels from $(\ell, q) \in \mathbb{L} \times \mathbb{Q}$ to $(\tilde{\ell}, \tilde{q}) \in \mathbb{L} \times \mathbb{Q}$ may also be limited. In such an example, the net-benefit functionals may include expected revenue, expected maintenance cost and expected workforce-decision costs, at the state-space level of $(\ell, q)$, and may be represented as:

$$\mathcal{R}_{(\ell,q)}(t) = \check{r}_{(\ell,q)}(t) \times \mathbb{E}[X_{(\ell,q)}(t) \wedge D_{(\ell,q)}(t)]$$

$$\mathcal{C}_{(\ell,q)}(t) = \check{c}_{(\ell,q)}(t) \times \mathbb{E}[X_{(\ell,q)}(t)]$$

$$\mathcal{H}_{(\ell,q)}(t) = \check{h}_{(\ell,q)}(t) \times \mathbb{E}[H_{(\ell,q)}(t)]$$

$$\mathcal{G}_{(\ell,q),(\tilde{\ell},\tilde{q})}(t) = \check{g}_{(\ell,q),(\tilde{\ell},\tilde{q})}(t) \times \mathbb{E}[V_{(\ell,q),(\tilde{\ell},\tilde{q})}(t)]$$

$$\mathcal{M}_{(\ell,q)}(t) = \check{m}_{(\ell,q)}(t) \times \mathbb{E}[M_{(\ell,q)}(t)]$$

where $\check{r}_{(\ell,q)}(t)$ and $\check{c}_{(\ell,q)}(t)$ respectively denote the reward and cost rate of a resource possessing attributes $(\ell, q)$, $D_{(\ell,q)}(t)$ denotes a random variable of the demand for resources possessing attributes $(\ell, q)$, $\check{h}_{(\ell,q)}(t)$ denotes a cost rate of adding a resource possessing attributes $(\ell, q)$, $\check{m}_{(\ell,q)}(t)$ denotes the cost rate of incentivization decisions, and $\check{g}_{(\ell,q),(\tilde{\ell},\tilde{q})}(t)$ denotes the cost rate of training and related decisions applied to a resource possessing attributes $(\ell, q)$ to influence resources transitions to $(\tilde{\ell}, \tilde{q})$, all for period t. Thus, the corresponding optimal control problem represented by controlled model 174 may be represented as:

$$\sum_{y=1}^{T} \sum_{(\ell,q)} \left( \mathcal{R}_{(\ell,q)}(t) - \mathcal{C}_{(\ell,q)}(t) - \mathcal{H}_{(\ell,q)}(t) - \mathcal{M}_{(\ell,q)}(t) - \sum_{(\tilde{\ell},\tilde{q})} \mathcal{G}_{(\ell,q),(\tilde{\ell},\tilde{q})}(t) \right)$$

In another example, the controls 172 may include constraints and objectives relating to a certain degree of aggregation needed for various financial planning for the entity 130, such as the need to reduce the complexity of the enterprise operations of the entity 130 and to forecast future demand at a optimal (e.g., most) accurate level (e.g., forecasting may not always be the most accurate at the lowest granularities of resource attributes). For this example, the demand forecast will be produced for any combination of family of skills f and position level $\ell$, not distinguishing productivity levels (e.g. keeping q fixed). Hence, the net-benefit functionals will be expressed at the state-space level of $(f, \ell)$, and $\mathcal{M}_{(f,\ell)}(t) = \check{m}_{(f,\ell)}(t) \times \mathbb{E}[M_{(f,\ell)}(t)]$, which includes the consideration of addition of extra costs for any resource decisions and assessment. Thus, the corresponding optimal control problem represented by controlled model 174 may be represented as:

$$\sum_{y=1}^{T} \sum_{(f,\ell) \in \mathbb{F} \times \mathbb{L}} \left( \mathcal{R}_{(f,\ell)}(t) - \mathcal{C}_{(f,\ell)}(t) - \mathcal{H}_{(f,\ell)}(t) - \mathcal{M}_{(f,\ell)}(t) - \sum_{\substack{(\tilde{f},\tilde{\ell}) \in \mathbb{F} \times \mathbb{L} \\ (\tilde{f},\tilde{\ell}) \neq (f,\ell)}} \mathcal{G}_{(f,\ell),(\tilde{f},\tilde{\ell})}(t) \right)$$

where $$K(t, X(t), H(t), V(t), M(t)) = \sum_{(f,\ell) \in \mathbb{F} \times \mathbb{L}} \left( \mathcal{R}_{(f,\ell)}(t) - \mathcal{C}_{(f,\ell)}(t) - \mathcal{H}_{(f,\ell)}(t) - \mathcal{M}_{(f,\ell)}(t) - \sum_{\substack{(\tilde{f},\tilde{\ell}) \in \mathbb{F} \times \mathbb{L} \\ (\tilde{f},\tilde{\ell}) \neq (f,\ell)}} \mathcal{G}_{(f,\ell),(\tilde{f},\tilde{\ell})}(t) \right)$$

The processor 120 may further derive one or more structural properties for the optimal control problems presented above (for fixed f, and fixed q). In an example, a stochastic dynamic program may be formulated and solved by the processor 120 to derive the structural properties of the control problems. For example, a stochastic dynamic program may be defined with a value function, denoted as J(t, X(t)), that represents a value function for maximizing an expected net-benefit of the optimal control problem over the time horizon from t to T. The stochastic dynamic program, which may be solved by the processor 120, may be expressed as:

$$J(t,X(t)) = \max P(t,X(t),H(t),V(t),M(t))$$

$$P(t,X(t),H(t),V(t),M(t)) = K(t,X(t),H(t),V(t),M(t)) + \mathbb{E}[J(t+1,X(t+1))]$$

where this stochastic dynamic program may be used to obtain one or more structural properties. In an example, a structural property may be, for any time t, there exists a finite control vector that optimizes the stochastic dynamic program, whose solution renders the optimal control policy for the control problem of the controlled model 174 relating to the fixed q. The structural property allows the processor 120 to efficiently compute an optimal solution of the controlled model 174 relating to the fixed q through convex programming, particularly for small to moderate size control problems. However, in examples where the size of the state space $\mathbb{N}$ increases to large-scale systems, the optimal control of the fluid limit of the controlled model 174 may be considered.

A state space of the approximated controlled model (of controlled model 174) may be $\mathbb{N} := \{n \in (\omega)_{\omega \in \mathbb{B}} : n \leq N\}$, where $\mathbb{B} := \mathbb{F} \times \mathbb{L} \times \mathbb{Q}$ represents the set of all possible combinations of the tier, function, and productivity attributes (f, $\ell$, q). In an example, the controls 172 being applied on the mean-field approximated controlled model 174 may represent the resource decisions available to the entity at any time period. Let h(t) be a $|\mathbb{B}|$-dimensional vector that represents the expected number of additions to the population of resource for every $\omega$ through resource additions at time t, and v(t) denotes a $|\mathbb{B}| \times |\mathbb{B}|$ matrix that represents the expected number of transitions from the population for every $\omega$ to the population for every other $\omega$ through any combination of skill acquisition, level promotion, or productivity adjustment at time t, where $\omega := (f, \ell, q)$ and $\tilde{\omega} := (\tilde{f}, \tilde{\ell}, \tilde{q})$. Further, let m(t) be a $|\mathbb{B}|$-dimensional vector that represents the amount of incentives (financially and organizationally) provided to improve expected retention, thus reducing expected amount of lost resources. Let x(t):=

$(x_\omega(t))_{\omega \in \mathbb{B}}$ to be the deterministic dynamical system governed by the mean field control process (e.g., the vector of the expected population for each combination of attributes (f, $\ell$, q)$\in \mathbb{B}$ at time t). Thus, the resource dynamics corresponding to the controlled model 174 with the addition of controls h(t), v(t) and m(t) may become the approximated controlled model 174 denoted as x(t+1) and expressed as:

$$x(t+1)=x(t)+h(t)+(v'(t)-v(t))1+(w^{*(t)}-w(t))1-a_M(t)$$

where 1 denotes a $|\mathbb{B}|$-dimensional vector whose components are all 1, $a_M(t)$ denotes a $|\mathbb{B}|$-dimensional vector representing the expected amount of lost resources at time t given that $m_\omega(t)$ amount of incentives are provided to each $\omega \in \mathbb{B}$, and w(t) denotes a $|\mathbb{B}| \times |\mathbb{B}|$ matrix representing the expected transitions between different resources which are not managed by the entity 130. Note that the probability laws governing $a_M(t)$ and w(t) depend on the state x(t) and controls h(t), v(t) and m(t).

Using the above approximation of controlled model 174, a control problem of the controlled model 174 with fixed q may be formulated with $\tilde{\mathcal{M}}_{(f,\ell)}(t) = \tilde{m}_{(f,\ell)}(t) \times m_{(f,\ell)}(t)$, which include the addition of extra costs for any resource decisions taken. The control problem of the controlled model 174 with fixed q may be represented as:

$$\sum_{y=1}^{T} \sum_{(f,\ell) \in \mathbb{F} \times \mathbb{L}} \left( \check{\mathcal{R}}_{(f,\ell)}(t) - \check{C}_{(f,\ell)}(t) - \check{\mathcal{H}}_{(f,\ell)}(t) - \check{\mathcal{M}}_{(f,\ell)}(t) - \sum_{\substack{(\bar{f},\bar{\ell}) \in \mathbb{F} \times \mathbb{L} \\ (\bar{f},\bar{\ell}) \neq (f,\ell)}} \check{\mathcal{G}}_{(f,\ell),(\bar{f},\bar{\ell})}(t) \right)$$

In order to solve this deterministic optimal control problem, the following standard discrete-time linear dynamical system is used:

$$x(t+1)=A(t)y(t)+B(t)u(t)$$

where $A(t)=[I_{|\mathbb{B}|}, I_{|\mathbb{B}|}]$, y'(t)=[x(t), (w'(t)-w(t))1], $B(t)=[\tilde{B}(t), \mathbb{B}, -I_{|\mathbb{B}|}]$, and u(t)=[$\tilde{v}'(t)$, h(t), $a_m(t)$]. $\tilde{B}(t)$ may denote a $|\mathbb{B}| \times |\mathbb{B}|$ matrix whose element equals 1 when k≠i and $\bar{k}$=i, and equals −1 when k=i and $\bar{k}$≠i, and equals 0 when k=$\bar{k}$=i. $\tilde{v}'(t)$ denotes the vectorization of a matrix v(t), and $I_k$ denotes a k×k identity matrix. The notations x(t) and u(t) may be the state and decision vectors of the linear dynamical system at time t, respectively. The processor 120 may determine outcomes 175, which in this example is an appropriate set of decision vectors u(0), . . . , u(T−1) that may optimize a performance over the time horizon T. The objective function, which may be indicated by the controls 172, may be related to identifying a global maximum denoted as:

$$\max \sum_{t=0}^{T-1} [p(t+1) \cdot x(t+1) - d(t) \cdot u(t)]$$

where p(t) represents, in vector form, state profits as a difference between $\hat{\mathcal{R}}_{(f,\ell)}(t)$ and $\hat{c}_{(f,\ell)}(t)$ at time t, and d(t) represents, in vector form, resource decision costs as the sum of $\hat{g}_{(f,\ell),(\bar{f},\bar{\ell})}(t)$, $\hat{\mathcal{H}}_{(f,\ell)}(t)$, and $\tilde{\mathcal{M}}_{(f,\ell)}(t)$ at time t. The processor 120 may formulate and solve a linear program denoted as:

$$\max \psi \cdot \phi$$

$$s.t. \psi'=[x(1) \ldots x(T)u(0) \ldots u(T-1)] \geq 0,$$

$$\phi'=[p(1) \ldots p(T)-d(0) \ldots -d(T-1)],$$

$$x(t+1)=A(t)y(t)+B(t)u(t)t=0, \ldots, T-1, \quad (a)$$

$$0 \leq (v(t)+w(t))1 \leq x(t)t=0, \ldots, T-1, \quad (b)$$

$$0 \leq a_m(t) \leq a(t)t=0, \ldots, T-1, \quad (c)$$

where both the initial state vector x(0) and the weight vector $\phi$ are provided to the processor 120 as inputs, and the constraints (a), (b), (c) are all component-wise. These constraints ensure that, for all t, the state and decision vectors are nonnegative, the flow of resources out of each state are nonnegative and do not exceed the number of resources in the state, and the reduction in the amount of lost resources due to the incentivizing retention does not exceed the original amount of lost resources. The solution of this linear program provides an optimal vector $\psi^*$ from which the relevant information regarding optimal state vectors $x^*(t)$ for t=1, . . . , T, and optimal decision vectors $h^*(t)$, $v^*(t)$ and $m^*(t)$ for t=0, . . . , T−1, may be selected. In examples for large-scale systems, the above linear program may be solved with optimization software. In some examples, when the size of the linear program becomes significantly large that the computation time by the processor 120 exceeds a desired response time, then subset of combinations of attributes (f, $\ell$, q) may be considered, instead of all the possible combinations of attributes (f, $\ell$, q). In an example, the processor 120 may extract data relating to resources that possess unions of particular elements in $\mathbb{F}$, $\mathbb{L}$, and $\mathbb{Q}$, to obtain aggregated sets of the family of skills $\bar{\mathbb{F}}$, the tier levels $\bar{\mathbb{L}}$ and the productivity levels $\bar{\mathbb{Q}}$, resulting in a reduced set of $\bar{\mathbb{B}} := \bar{\mathbb{F}} \times \bar{\mathbb{L}} \times \bar{\mathbb{Q}}$ such that the processor 120 may solve the above linear program using the reduced set $\bar{\mathbb{B}}$.

In some examples, the system 100 may further consider transition eligibility of the resources among the entity 130. For example, after a particular amount of time, a first tier resource may be eligible to be promoted to a second tier, where the promotion may cause an increase in cost incurred on the entity 130. The promotion, in some examples, may also trigger transitions relating to other resources. For example, after promoting a tier of a resource, a new resource may be assigned to perform the tasks previously assigned to the promoted resource. Further, a requirement for particular productivity demands may also change in response to a promotion of tier (e.g., an increase in an expected efficiency from a resource of a higher tier). Thus, the model 170 and controlled model 174 generated by the system 100 may account for various forecast of transitions based on known transition eligibility defined by the entity 130.

In some examples, the outcomes 175 may be stored in the memory 122 such that the processor 120 may use the outcomes 175 to retrain the model 170 autonomously using updated outcomes 175. Further, the processor 120 may update the resource database 126 periodically or in response to transitions of resources, such as addition, tier promotion, and/or other transitions, and may use the updated data in the resource database 126 to retrain the model 170 autonomously.

Further, in examples where the resources are part of the workforce of the entity 130, the outcomes 175 may be provided to the resource such that the resource may review the model 170 indicating a forecast of their career trajectory. Therefore, each individual among the workforce may be aware of any potential needs, such as training or enhancement, that may help them improve their career trajectory.

Figure 2:
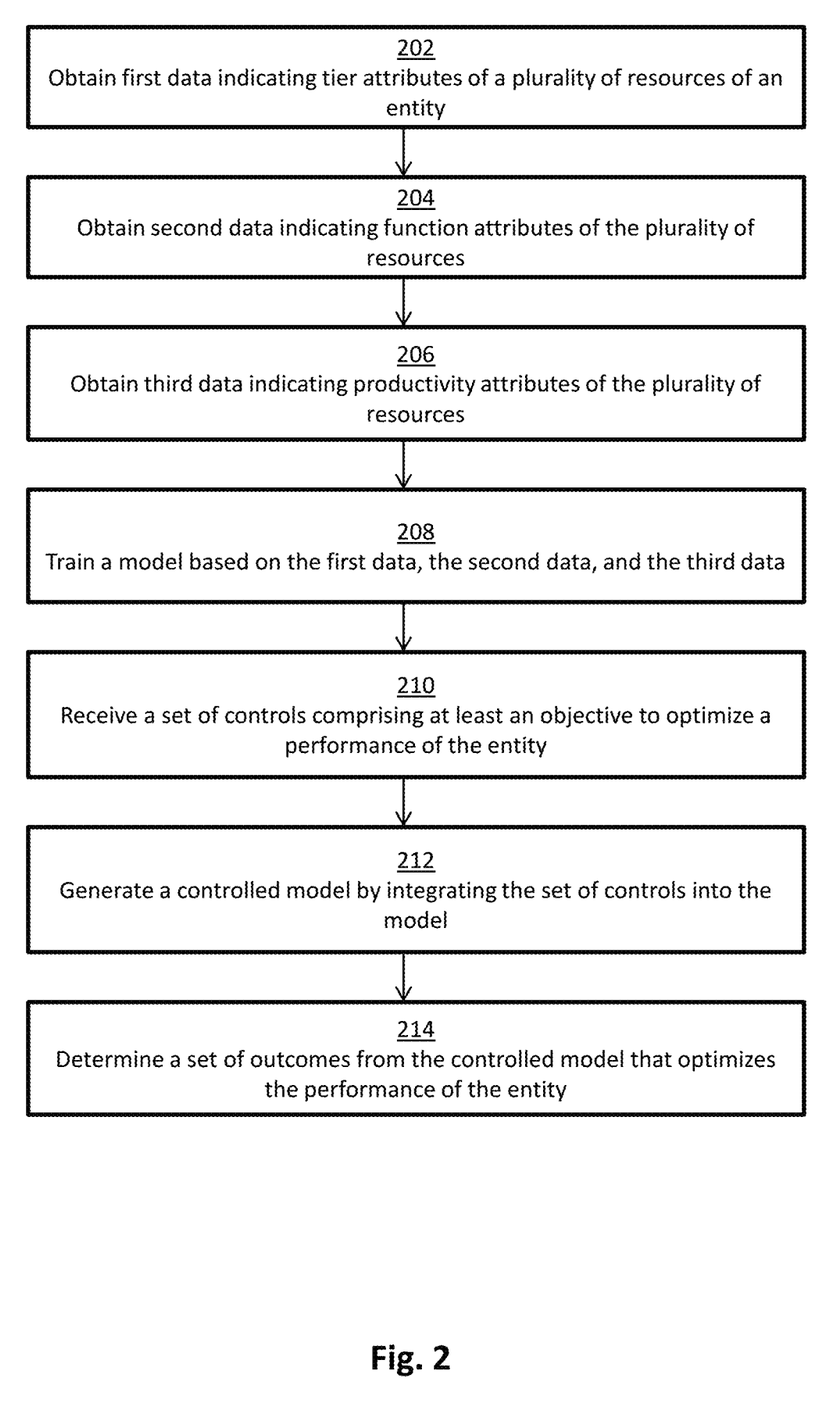
FIG. 2 illustrates a flow diagram relating to a process, in one embodiment, to implement performance evaluation based on resource dynamics.

FIG. 2 illustrates a flow diagram relating to a process, in one embodiment, to implement performance evaluation based on resource dynamics, arranged in accordance with at least some embodiments presented herein. The process in FIG. 2 may be implemented using, for example, computer system 100 discussed above. An example process may include one or more operations, actions, or functions as illustrated by one or more of blocks 202, 204, 206, 208, 210, 212, and/or 214. Although illustrated as discrete blocks, various blocks may be divided into additional blocks, combined into fewer blocks, eliminated, or performed in parallel, depending on the desired implementation.

Processing may begin at block 202, where a processor obtains first data indicating tier attributes of a plurality of resources of an entity. The first data includes a quantified tier of the tier attributes of the plurality of resources. Processing may continue from block 202 to block 204. At block 204, the processor obtains second data indicating function attributes of the plurality of resources. The second data includes a competency level of each function among the function attributes possessed by each resource among the plurality of resources. Processing may continue from block 204 to block 206. At block 206, the processor obtains third data indicating productivity attributes of the plurality of resources. The productivity attributes are based on historical data relating to performance of the plurality of resources.

Processing may continue from block 206 to block 208. At block 208, the processor trains a model based on the first data, the second data, and the third data. The model represents one or more transitions of the plurality of resources over time. The transitions of the plurality of resources are based on the tier attribute, the function attribute, and the productivity attribute of the plurality of resources. In some examples, the model is based on a time inhomogeneous Markov chain.

Processing may continue from block 208 to block 210. At block 210, the processor receives a set of controls comprising at least an objective to optimize a performance of the entity. Processing may continue from block 210 to block 212. At block 212, the processor generates a controlled model by integrating the set of controls into the model. Processing may continue from block 212 to block 214. At block 214, the processor determines a set of outcomes from the controlled model. The set of outcomes includes at least a set of transitions relating to the plurality of resources, and the set of transitions optimizes the performance of the entity.

In some examples, the set of outcomes may include recommendations to add at least one resource of a particular attribute to the plurality of resources, where the particular attribute comprising at least one of the tier attribute, the function attribute, and the productivity attribute. The set of outcomes may further include recommendations to modify at least one composition of resources in the entity. The set of outcomes may further include recommendations to assign different tasks to at least one composition of the resources in the entity. In some examples, the processor may further determine an amount of resources of the plurality of resources exceeds a threshold, and apply an approximation technique on the model to determine the set of outcomes. The processor may further include retraining the model using the set of outcomes.

Figure 3:
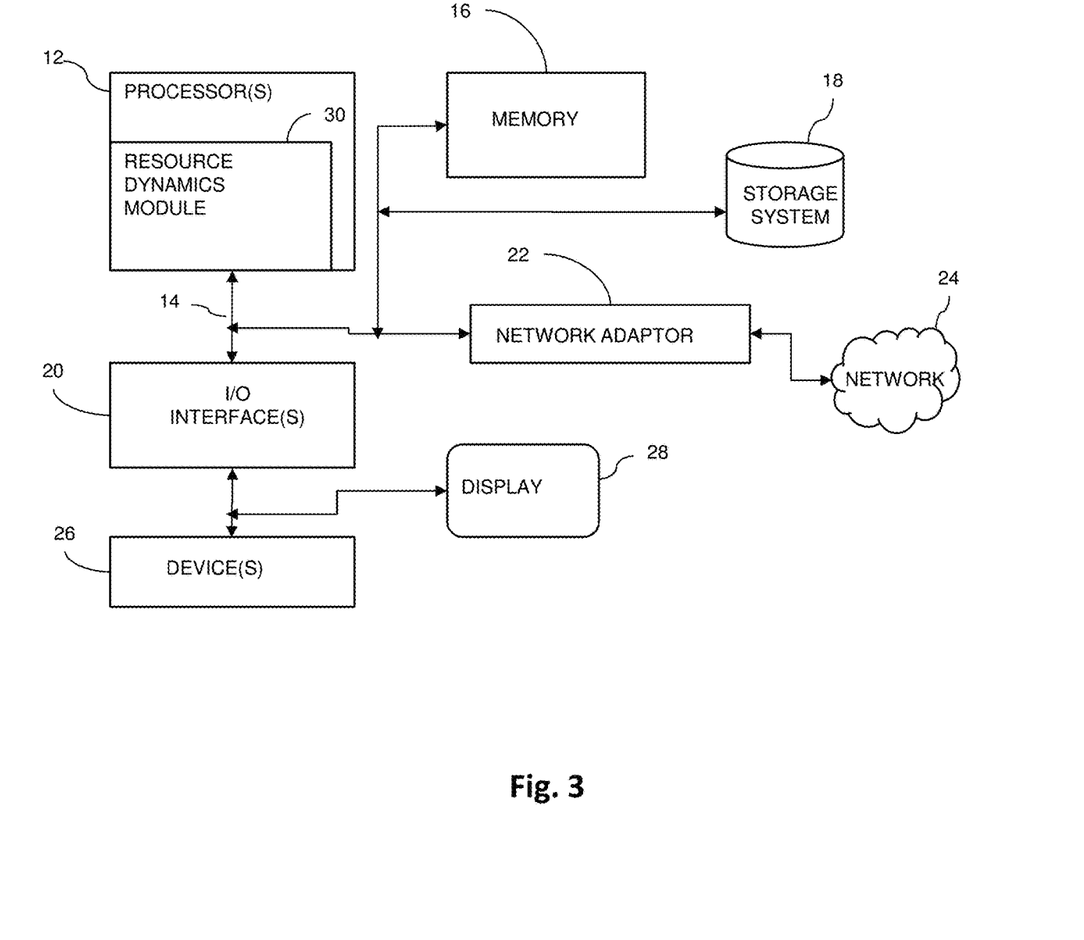
FIG. 3 illustrates a schematic of an example computer or processing system that may implement performance evaluation based on resource dynamics in one embodiment.

FIG. 3 illustrates a schematic of an example computer or processing system that may implement performance evaluation based on resource dynamics in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., resource dynamics module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 4:
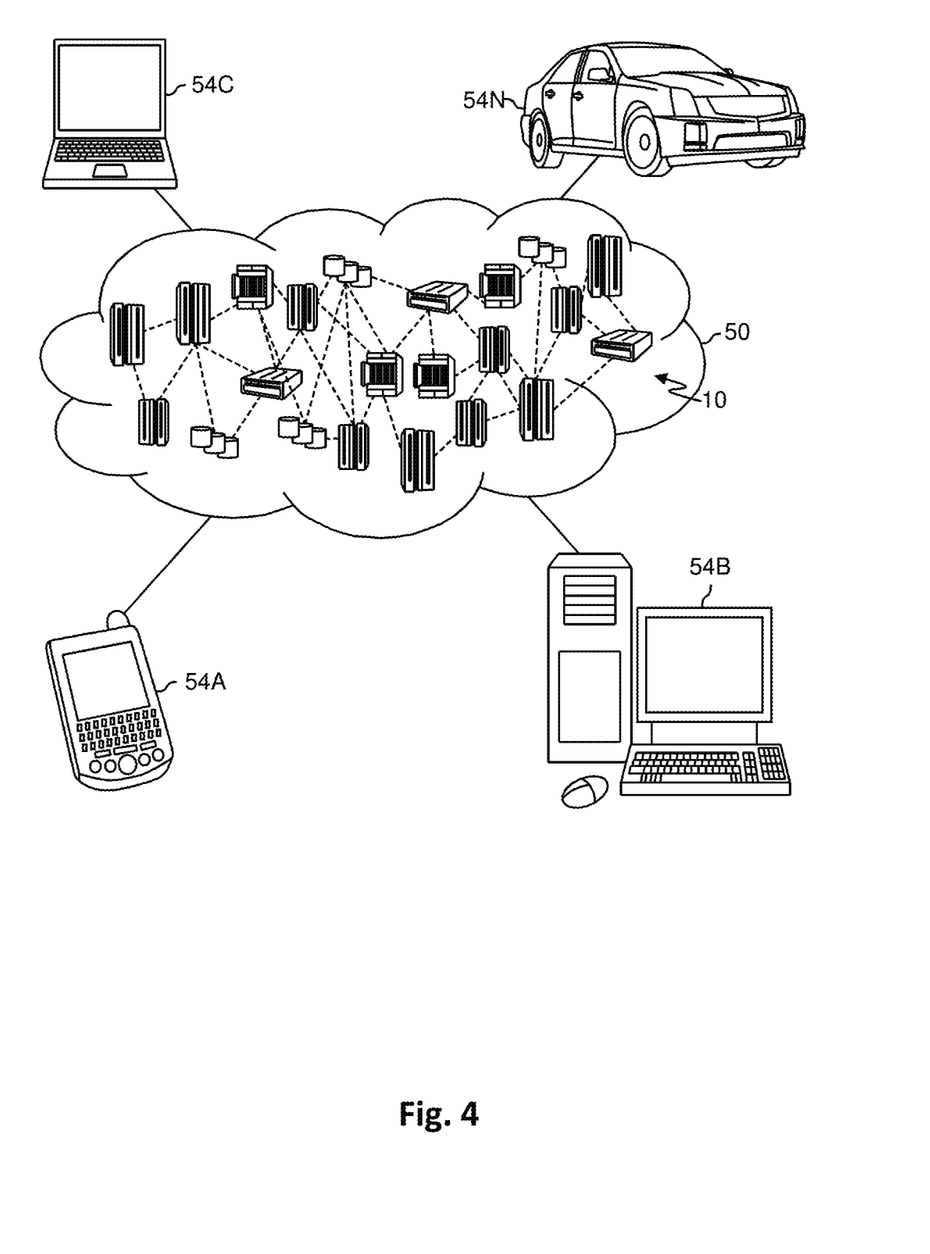
FIG. 4 depicts a cloud computing environment according to an embodiment of the present invention.

FIG. 4 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
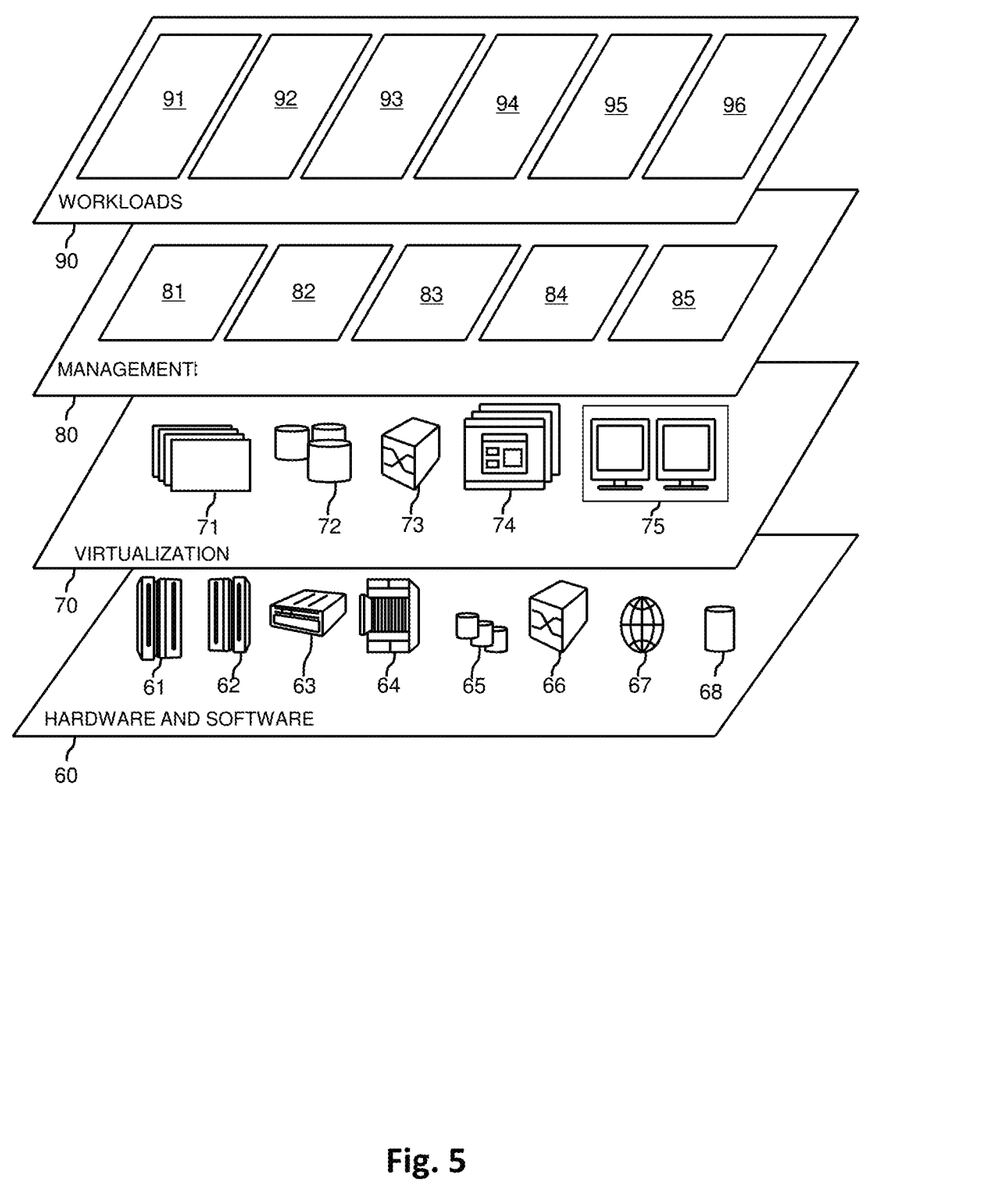
FIG. 5 depicts abstraction model layers according to an embodiment of the present invention.

FIG. 5 depicts abstraction model layers according to an embodiment of the present invention. Referring now to FIG. 125 a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource dynamics modeling 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
obtaining, by a processor, first data indicating tier attributes of a plurality of resources of an entity;
obtaining, by the processor, second data indicating function attributes of the plurality of resources;
obtaining, by the processor, third data indicating productivity attributes of the plurality of resources;
quantifying, by the processor, the first data, the second data, and the third data such that the tier attributes, the function attributes, and the productivity attributes are represented in a format processible by the processor to train a machine learning model;
training, by the processor, a model based on the quantified first data, the quantified second data; and the quantified third data, wherein the trained model is developed to characterize evolutions of the plurality of resources over time, the evolutions of the plurality of resources includes one or more transitions of the plurality of resources over time, and the transitions of the plurality of resources are based on the tier attribute, the function attribute, and the productivity attribute of the plurality of resources;
receiving, by the processor, a set of controls comprising at least an objective to optimize a performance of the entity;
generating, by the processor, a controlled model by integrating the set of controls into the model; and
determining, by the processor, a set of outcomes from the controlled model, wherein the set of outcomes comprises at least a set of transitions relating to the plurality of resources, and the set of transitions optimizes the performance of the entity.

2. The computer-implemented method of claim 1, wherein the model is based on a time inhomogeneous Markov chain.

3. The computer-implemented method of claim 1, wherein the second data comprises a competency level of each function among the function attributes possessed by each resource among the plurality of resources.

4. The computer-implemented method of claim 1, wherein the productivity attributes are based on historical data relating to performance of the plurality of resources.

5. The computer-implemented method of claim 1, wherein the set of outcomes indicate at least one of:
a recommendation to add at least one resource of a particular attribute to the plurality of resources, the particular attribute comprising at least one of the tier attribute, the function attribute, and the productivity attribute;

a recommendation to modify at least one composition of resources in the entity; and a recommendation to assign different tasks to at least one composition of the resources in the entity.

6. The computer-implemented method of claim 1, further comprising:

determining an amount of resources of the plurality of resources exceeds a threshold; and applying an approximation technique on the model to determine the set of outcomes.

7. The computer-implemented method of claim 1, further comprising retraining the model using the set of outcomes.

8. A system comprising:

a memory device configured to store a database that comprises:

first data indicating tier attributes of a plurality of resources of an entity;

second data indicating function attributes of the plurality of resources;

third data indicating productivity attributes of the plurality of resources;

a hardware processor configured to be in communication with the memory device, the hardware processor being configured to:

obtain the first data, the second data, and the third data from the memory device;

quantify the first data, the second data, and the third data such that the tier attributes, the function attributes, and the productivity attributes are represented in a format processible by the processor to train a machine learning model;

train a model based on the quantified first data, the quantified second data, and the quantified third data, wherein the trained model is developed to characterize evolutions of the plurality of resources over time, the evolutions of the plurality of resources includes one or more transitions of the plurality of resources over time, and the transitions of the plurality of resources are based on the tier attribute, the function attribute, and the productivity attribute of the plurality of resources;

receive a set of controls comprising at least an objective to optimize a performance of the entity;

generate a controlled model by integrating the set of controls into the model; and determine a set of outcomes from the controlled model, wherein the set of outcomes comprises at least a set of transitions relating to the plurality of resources, and the set of transitions optimizes the performance of the entity.

9. The system of claim 8, wherein the model is based on a time inhomogeneous Markov chain.

10. The system of claim 9, wherein:

the second data comprises a competency level of each function among the function attributes possessed by each resource among the plurality of resources; and the productivity attributes are based on historical data relating to performance of the plurality of resources.

11. The system of claim 8, wherein the set of outcomes indicate at least one of:

a recommendation to add at least one resource of a particular attribute to the plurality of resources, the particular attribute comprising at least one of the tier attribute; the function attribute, and the productivity attribute;

a recommendation to modify at least one composition of resources in the entity; and a recommendation to assign different tasks to at least one composition of the resources in the entity.

12. The system of claim 8, wherein the hardware processor is further configured to:

determine an amount of resources of the plurality of resources exceeds a threshold; and apply an approximation technique on the model to determine the set of outcomes.

13. The system of claim 8, wherein the hardware processor is further configured to retrain the model using the set of outcomes.

14. A computer program product of evaluating a performance of an entity, the computer program product comprising a non-transitory computer readable storage medium having program instructions embodied therewith, the program instructions executable by a processing element of a device to cause the device to:

obtain first data indicating tier attributes of a plurality of resources of an entity;

obtain second data indicating function attributes of the plurality of resources;

obtain third data indicating productivity attributes of the plurality of resources;

quantify the first data, the second data, and the third data such that the tier attributes, the function attributes, and the productivity attributes are represented in a format processible by the processor to train a machine learning model;

train a model based on the quantified first data, the quantified second data, and the quantified third data, wherein the trained model is developed to characterize evolutions of the plurality of resources over time, the evolutions of the plurality of resources includes one or more transitions of the plurality of resources over time, and the transitions of the plurality of resources are based on the tier attribute, the function attribute, and the productivity attribute of the plurality of resources;

receive a set of controls comprising at least an objective to optimize a performance of the entity;

generate a controlled model by integrating the set of controls into the model; and determine a set of outcomes from the controlled model, wherein the set of outcomes comprises at least a set of transitions relating to the plurality of resources, and the set of transitions optimizes the performance of the entity.

15. The computer program product of claim 14, wherein the model is based on a time inhomogeneous Markov chain.

16. The computer program product of claim 14, wherein:

the second data comprises a competency level of each function among the function attributes possessed by each resource among the plurality of resources; and the productivity attributes are based on historical data relating to performance of the plurality of resources.

17. The computer program product of claim 14, wherein the set of outcomes indicate at least one of:

a recommendation to add at least one resource of a particular attribute to the plurality of resources, the particular attribute comprising at least one of the tier attribute, the function attribute, and the productivity attribute;

a recommendation to modify at least one composition of resources in the entity; and a recommendation to assign different tasks to at least one composition of the resources in the entity.

18. The computer program product of claim 14, wherein the program instructions are further executable by the processing element of the device to cause the device to:
   determine an amount of resources of the plurality of resources exceeds a threshold; and
   apply an approximation technique on the model to determine the set of outcomes.

19. The computer program product of claim 14, wherein the program instructions are further executable by the processing element of the device to cause the device to retrain the model using the set of outcomes.

* * * * *